No. 644,401. Patented Feb. 27, 1900.
M. BROWNE.
BAKE PAN.
(Application filed Apr. 17, 1899.)

(No Model.) 2 Sheets—Sheet 1.

WITNESSES:
M. H. Wurtzel
G. C. Geibel

INVENTOR
Margaret Browne
by Forrest Paegeler
ATTORNEYS.

THE NORRIS PETERS CO., PHOTO-LITHO., WASHINGTON, D. C.

No. 644,401. Patented Feb. 27, 1900.
M. BROWNE.
BAKE PAN.
(Application filed Apr. 17, 1899.)
(No Model.) 2 Sheets—Sheet 2.
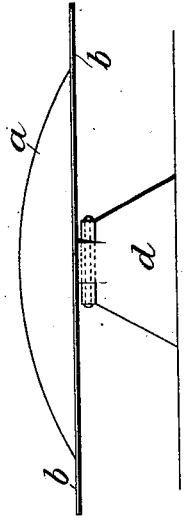
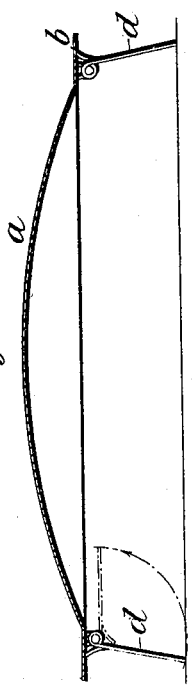
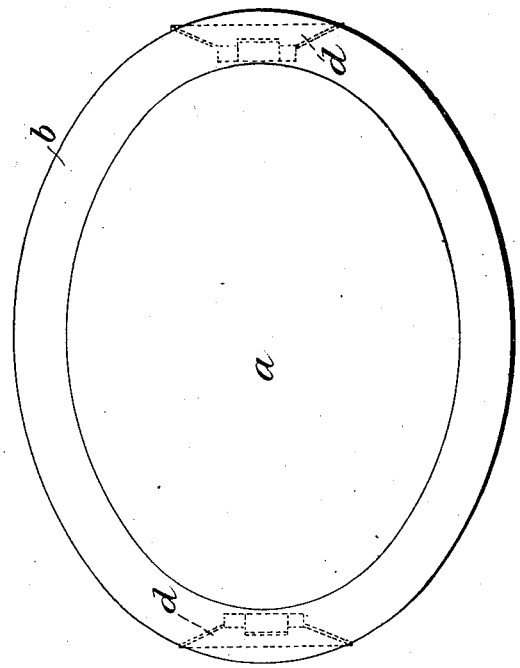
WITNESSES:
M. H. Wurtzel
G. C. Geibel
INVENTOR
Margaret Browne
BY
Grauer Raegener
ATTORNEYS.

UNITED STATES PATENT OFFICE.

MARGARET BROWNE, OF WORKSOP, ENGLAND.

BAKE-PAN.

SPECIFICATION forming part of Letters Patent No. 644,401, dated February 27, 1900.

Application filed April 17, 1899. Serial No. 713,292. (No model.)

*To all whom it may concern:*

Be it known that I, MARGARET BROWNE, a subject of the Queen of Great Britain, residing at 29 Park street, Worksop, in the county of Nottingham, England, have invented certain new and useful Improvements in Bake-Pans, of which the following is a specification.

This invention relates to improvements in pans for baking pastry for pies, tarts, &c.; and the invention consists of a pan for baking pastry-crusts, consisting of a baking-plate formed with a concavo-convex central portion and a surrounding rim and supporting-legs attached to said rim; and the invention consists, further, of a bake-pan for baking pastry-crusts, comprising a baking-plate having a concavo-convex central portion and a straight level rim and supporting-legs attached to said rim.

Figure 2:
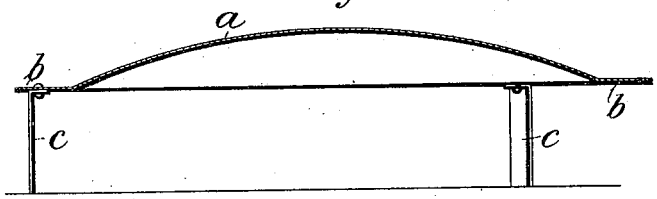
Figure 1:
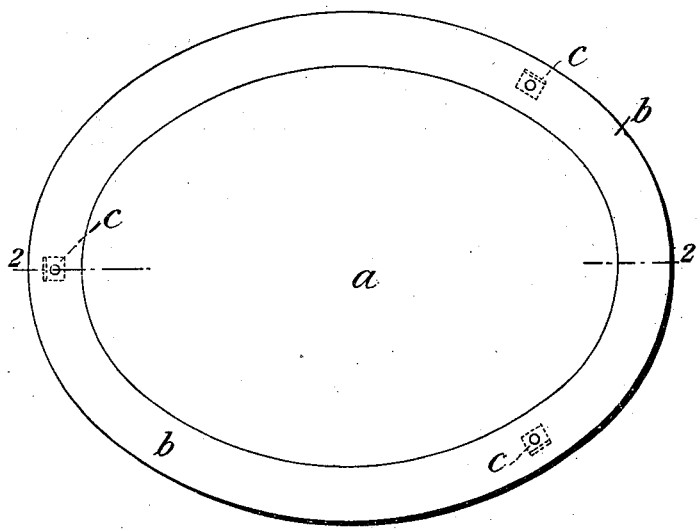

In the accompanying drawings, Figure 1 is a plan of my improved bake-pan. Fig. 2 is a vertical section on line 2 2, Fig. 1. Figs. 3 and 4 are corresponding views of a bake-pan with only two supporting-legs. Fig. 5 is an end view of the construction shown in Figs. 3 and 4, and Fig. 6 is an end view showing a modified construction of supporting-legs.

My improved bake-pan is formed of a baking-plate, to which are attached suitable legs adapted to support the plate above the bottom of the oven in which the bake-pan is placed for baking pastry. In the figures, $a$ represents the central portion of this baking-plate, which central portion is of concavo-convex form, and $b$ is a surrounding straight level rim. The baking-plate may be formed in this shape by stamping. Legs $c\,c$ (shown in Figs. 1 and 2) are attached to the rim $b$ of the baking-plate in any suitable manner. In Figs. 3, 4, and 5 only two legs are employed, which are spring-hinged to the rim $b$. In Fig. 6 legs $e$ of wire are employed. Any other suitable form of legs or support for the baking-plate may be employed. As indicated in dotted lines in Fig. 4, the hinged legs (indicated in Fig. 4 by the letters $d\,d$) may be folded up to the under side of the rim $b$ of the baking-plate when out of use.

My improved bake-pan is used as follows: The pastry to be baked is placed upon the baking-plate $a\,b$ and trimmed to correspond approximately with the edge thereof and then the bake-pan, with the pastry thereon, is placed in the oven and the pastry there baked, the heat baking the pastry both on the upper side and the under side, the thinness of the metal plate and the fact of the latter being raised above the oven-bottom permitting the heat to thoroughly and evenly bake the pastry as well on the under side as the upper side. In making a pie the fruit or other substance with which it is to be made is cooked or prepared separately and the pie prepared without an upper crust. The baked upper crust is now lifted off my improved bake-pan and placed on the pie-dish, over the contents therein, and the pie is now ready for serving. The concavo-convex form of my improved bake-pan imparts to the crust baked thereon a form of the required shape suitable also for a tart, the crust in this case being used as an under crust to contain the fruit in the usual manner. The shape is specially adapted for this purpose as well as for making pie-crusts. The baking-plate center imparts the required shape to the central part of the crust or pastry baked thereon for each tart, while the surrounding rim of the baking-plate imparts to the pastry an edge corresponding in form to the top edge of a pie-dish, the pastry baked thereon being thereby adapted for use either for tarts or pies. In baking crusts for pies the concavo-convex form of baking-plate has also the great advantage that it secures a crust of arch form which is thoroughly baked and which by reason of its arched shape and thorough baking on both sides is very strong and will keep its shape. The strength of the center is also increased by the surrounding rim, which imparts strength to the edge of the arched center and likewise protects the edge from breakage. The combination of these features—namely, the arched center, the surrounding rim, and the thorough and even baking, all obtained by my improved bake-pan—produces a crust which while light and crisp, at the same time is much stronger than crusts baked in the usual manner and which keeps its shape and preserves the fine appearance of the dish until eaten. The self-sustaining archiform crust, furthermore, has the great practical advantage that it permits "piling up" of the fruit or other pie substance, after the baking of the same, before application of the crust. This is of great utility where the pie-dish is shallow. In baking a pie in the usual manner this piling up is not practicable, because the pie substance levels itself more or less in baking; but in making a pie in which my improved pie-crust is employed the pie substance is prepared in any suitable manner and may then be piled up in a comparatively shallow dish, so that a pie having a large quantity of pie substance and arched in the center can be made. Then when the pie-crust is placed over the piled-up pie substance it is done with the confidence that the crust will reliably keep its shape and not settle after baking, as do pie-crusts baked in the ordinary manner on the pie. By baking the crusts separately from the remainder of the pie or tart and above the oven bottom or grating a crust is obtained which is thoroughly and crisply baked, and the sodden and indigestible crust caused when pies or tarts are baked in the ordinary way is avoided.

Having thus described my invention, I claim as new and desire to secure by Letters Patent—

1. A pan for baking pastry-crusts, consisting of a baking-plate formed with a concavo-convex central portion and a surrounding rim, and supporting-legs attached to said rim, substantially as set forth.

2. A pan for baking pastry-crusts, consisting of a baking-plate formed with a concavo-convex central portion and a surrounding straight, level rim, and supporting-legs attached to said rim, substantially as set forth.

MARGARET BROWNE.

Witnesses:
H. D. JAMESON,
A. NUTTING.